(12) United States Patent
Coates

(10) Patent No.: US 6,866,299 B2
(45) Date of Patent: Mar. 15, 2005

(54) SLURPIE HOSE CONNECTION

(75) Inventor: Gordon R. Coates, Augusta, MO (US)

(73) Assignee: Husky Corporation, a Missouri Corporation, Pacific, MO (US)

( * ) Notice: Subject to any disclaimer, the term of this patent is extended or adjusted under 35 U.S.C. 154(b) by 0 days.

(21) Appl. No.: 10/644,977

(22) Filed: Aug. 19, 2003

(65) Prior Publication Data

US 2004/0051308 A1 Mar. 18, 2004

Related U.S. Application Data

(60) Provisional application No. 60/404,545, filed on Aug. 20, 2002.

(51) Int. Cl.$^7$ .................................................. F16L 7/00
(52) U.S. Cl. ............................. 285/123.15; 285/123.1; 285/123.2; 141/44; 141/59
(58) Field of Search ........................... 285/123.1, 123.2, 285/123.3, 123.15, 124.1, 124.2; 141/44, 45, 46, 59, 392; 138/113, 114

(56) References Cited

U.S. PATENT DOCUMENTS

| | | | |
|---|---|---|---|
| 3,980,112 A | * | 9/1976 | Basham ...................... 141/392 |
| 4,090,539 A | * | 5/1978 | Krupp ......................... 141/198 |
| 4,566,504 A | | 1/1986 | Furrow et al. |
| 4,687,033 A | | 8/1987 | Furrow et al. |
| 4,754,782 A | * | 7/1988 | Grantham ................... 138/109 |
| 4,922,971 A | * | 5/1990 | Grantham ....................... 141/1 |
| 5,197,523 A | | 3/1993 | Fink, Jr. et al. |
| 5,285,744 A | | 2/1994 | Grantham et al. |
| 5,285,826 A | * | 2/1994 | Sanders et al. .............. 141/59 |
| 5,299,607 A | * | 4/1994 | Monticup, Jr. .............. 141/208 |
| 5,394,909 A | | 3/1995 | Mitchell et al. |
| 5,476,125 A | | 12/1995 | Mitchell |
| 5,520,228 A | | 5/1996 | Fink, Jr. et al. |
| 5,611,373 A | * | 3/1997 | Ashcraft ...................... 138/113 |
| 5,720,325 A | * | 2/1998 | Grantham ..................... 141/59 |

* cited by examiner

*Primary Examiner*—James M. Hewitt
(74) *Attorney, Agent, or Firm*—Paul M. Denk

(57) ABSTRACT

A slurpie hose connection, for attachment between the coaxial hose and the back end of a fuel dispensing nozzle, including two parts, a connector part that fits within the back end of the nozzle, a hose part that secures with the leading edge of the hose, such that when these two parts are brought together, and pushed into sealed engagement, a nut is fastened within the back end of the nozzle, to tightly and snuggly secure the hose connection together, available for prompt usage. A slurpie tube may fasten to tube fittings and extend forwardly in the nozzle, as known, and extend to the bottom of the coaxial hose, to act as a slurpie to remove any accumulated or condensed fuel, from this location, and to prevent its blockage of the return of vapors to the dispenser and for underground storage.

10 Claims, 4 Drawing Sheets

SLURPIE HOSE CONNECTION

CROSS-REFERENCE TO RELATED APPLICATION

This application is related to and claims priority upon the provisional patent application filed on Aug. 20, 2002, under application No. 60/404,545.

BACKGROUND OF THE INVENTION

As is well known in the art, environmental requirements, over the past decade or two, have made it essential that vapors and fumes generated during fuel dispensing, particularly at the myriad of service stations, be collected, at a high degree of efficiency, to prevent the entrance of such fumes into the atmosphere. Environmentalists have stated that these types of fumes may be detrimental to the quality of our air.

As a result, many different types of devices have been constructed, formulated, and which function essentially to recover a large part of the gasoline vapors, from the interface between the service station dispenser, the nozzle, and where it inserts into the automobile fill tank, in an effort to collect the generated vapors, and return or pump them back into the underground storage facility, in an effort to reduce such pollutants.

These types of vapor recovery systems may include pumps within the dispenser, that suck the vapors from the region of the nozzle, or from the vehicle fill tank, and return them back to storage, or in some instances, the low pressure generated proximate the venturi of a gasoline dispensing nozzle, may utilize its suction force to manipulate such vapors, for the purpose of their immediate collection. But, when these types of techniques are used to recover vapors, due to the condensability of such fuels, there is always the likelihood that the vapors may contain a certain amount of the fuel moisture, which may condense or coagulate into droplets, and accumulate in the dispensing hose, rather than get returned back to the dispenser, and to underground storage, as desired. As a result, it is necessary to keep these accumulated pockets of liquid fuel from blocking the vapor return pass within the coaxial fuel hose, which would otherwise prevent the return of vapors, and block their transmission back into storage. When that occurs, the vapors overflow from the nozzle, or from the vehicle, the return suction is eliminated, meaning that such vapors are disseminated into atmosphere, not only to present the alleged detriments claimed by the environmentalists, but also probably in violation of the various laws that have now been promulgated to require the collection of such vapors.

Hence, devices have been constructed which provide for the elimination of such accumulated fuels, particularly in the vapor return portion of the coaxial fuel dispensing hose, to eliminate this predicament. Such devices normally are called slurpies, as known in the art. The slurpie utilizes a small tube, that rests at the bottom of the low point of the fuel dispensing hose, in the vapor recovery line, interconnects from the hose through the nozzle and is subject to the vacuums generated by the venturi contained within the dispensing nozzle, to draw such accumulated droplets or pockets of fuel, back into the nozzle, and entrain them into the flow path of the fuel being dispensed by the nozzle into the fill tank of the vehicle. This has worked quite effective, in the past, to keep such vapor return lines clear, and unobstructed.

Examples of various types of vapor recovery systems, some of which may disclose slurpies, are shown in various prior United States patents. For example, U.S. Pat. No. 5,520,228, discloses a fuel extraction coupling for a nozzle. This shows the coupling for the tubing that connects with the slurpie pick up point, to deliver or provide for an extraction of any pooled fuel from the vapor recovery hose. U.S. Pat. No. 5,476,125, discloses a vapor recovery gasoline dispensing nozzle. In addition, a vapor control valve, for use in a fuel dispensing nozzle, is shown in U.S. Pat. No. 5,394,909. Also, U.S. Pat. No. 5,197,523, shows a dispensing nozzle improvement for extracting fuel from the coaxial hose, in the manner as previously described. All of these prior patents, as described herein, are owned by a common assignee to the invention as reviewed and explained in this application.

Other patents that show related technology include a coaxial hose assembly, as disclosed in U.S. Pat. No. 5,285,744. U.S. Pat. No. 4,566,504, shows an insertion tube liquid evacuator system for vapor recovery hose, of an early embodiment. U.S. Pat. No. 4,687,033, shows another early venturi liquid evacuator system for maintaining a clear vapor path in vapor recovery hose. These are examples of what are known in the prior art.

SUMMARY OF THE INVENTION

This invention relates generally to vapor recovery means provided within a fuel dispensing system, and more specifically, relates to a very simplified means for providing interconnection between the coaxial fuel dispensing hose, and the dispensing nozzle, incorporating the various connections for facilitating the interconnection of the coaxial hose to the nozzle, and the arrangement and installment of its slurpie system.

Essentially, this invention is developed in two parts, a nozzle segment for interconnecting the hose and slurpie system to a nozzle, which includes means for interconnecting the fuel flow path through this connection, and into the nozzle, while simultaneously providing for a separate and distinct vapor return path, for the retransmission and return of vapors back to the dispenser, and underground storage, all of which can be quickly and facilely connected together, when the hose and nozzle are assembled for usage. The second part of the system is the hose connecting component, which mates with the nozzle part, and can be quickly installed, fastened in place, to furnish a prompt interconnect of the fuel dispensing hose, with the nozzle, as readied for installation and usage.

The nozzle part of the connection is simply held in place by means of a retaining ring or other means of connection, held into position, fixedly and permanently, to handle and accommodate both the fuel and vapors, bypassing this part of the assembly. The hose portion of the connection simply slides into and interconnects with the nozzle part, and is held into position by means of a fastening nut, which can be tightened in position, immediately, for quick installation. Strategically located gaskets provide for fluidic sealing of the various components together, so that fuel, while being dispensed within the hose and nozzle, does not seep out or intermix with any of the returning vapors, normally bypassing in an opposite direction towards the dispenser, for collection and storage.

This particular connection means does not require the use of any type of biasing springs, or other mechanisms, to provide for its quick and simple installation, for prompt usage.

In addition, a conveniently available nut, threadedly or pressure engages within the open end of the nozzle, can be threaded into tightness, and afford and assure the sealed interconnection between the various components of this connector, and the coaxial hose, to furnish a fool proof operation.

It is, therefore, the principal object of this invention to provide for a simplified connection of a coaxial fuel dispensing hose to the nozzle, but yet readily attach and dispose all of the various operating components, such as the fuel path, the vapor path, and the slurpie mechanism, uniformly interconnected together, at the juncture between the coaxial hose and the nozzle, in a simplified two step operation.

Still another object of this invention is to provide for means for interconnecting a coaxial fuel dispensing hose to a nozzle, with a minimum of effort.

Another object of this invention is to provide for a minimum of interconnecting components that provide a fluidic and hermetic seal when connecting a coaxial fuel dispensing hose into the back end of a nozzle for delivering fuel to an automobile.

These and other objects may become more apparent to those skilled in the art upon review of the summary of this invention, and upon undertaking a study of the description of its preferred embodiment, in light of the drawings.

DESCRIPTION OF THE PREFERRED EMBODIMENT

Figure 1:
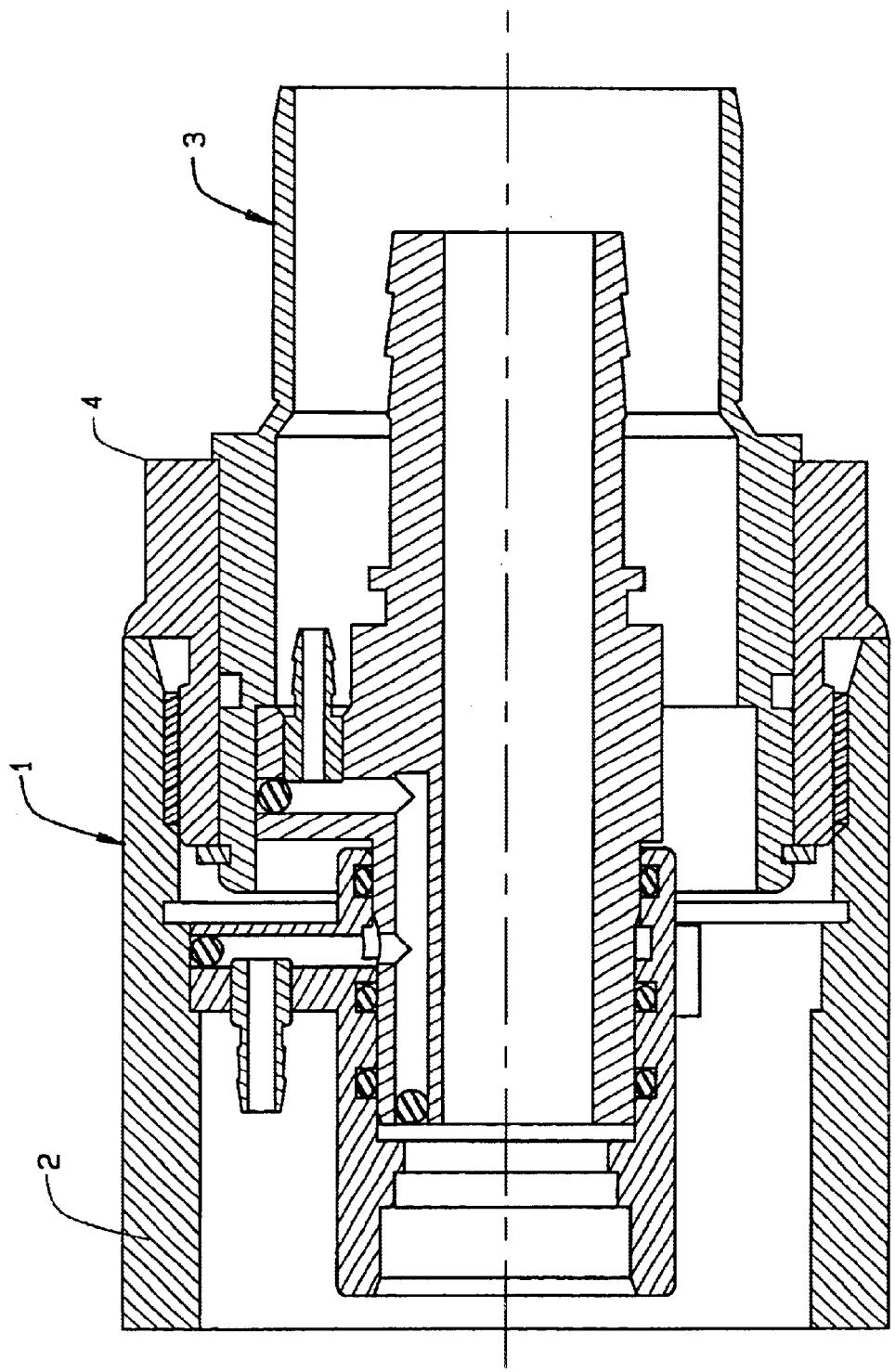
FIG. 1 is a longitudinal cross sectional view of the interconnection of the coaxial hose with the back end of the nozzle showing the connection of this invention.

In referring to the drawings, and in particular FIG. 1, the connection 1 of this invention, is readily disclosed mounted partially within the back end 2 of the fuel dispensing nozzle, providing the means for connection of the coaxial hose, as attach thereto, as at 3. A type of nozzle nut 4 threadedly or otherwise engages within the back end of the nozzle handle, as can be noted, to provide for the tight and secure retention of these components altogether, via the connection 1, as can be seen.

Figure 2:
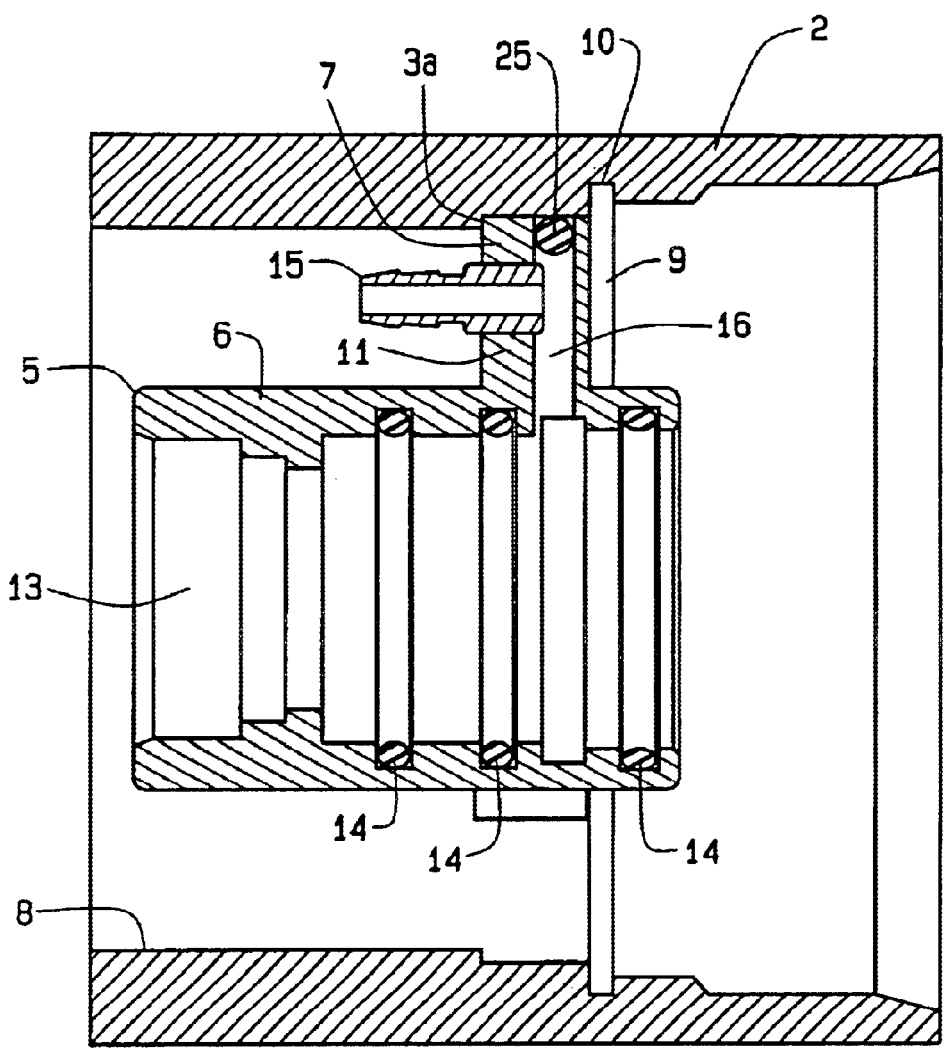
FIG. 2 shows the connection part that secures within the back end of the fuel dispensing nozzle before attachment of the coaxial hose.
Figure 4:
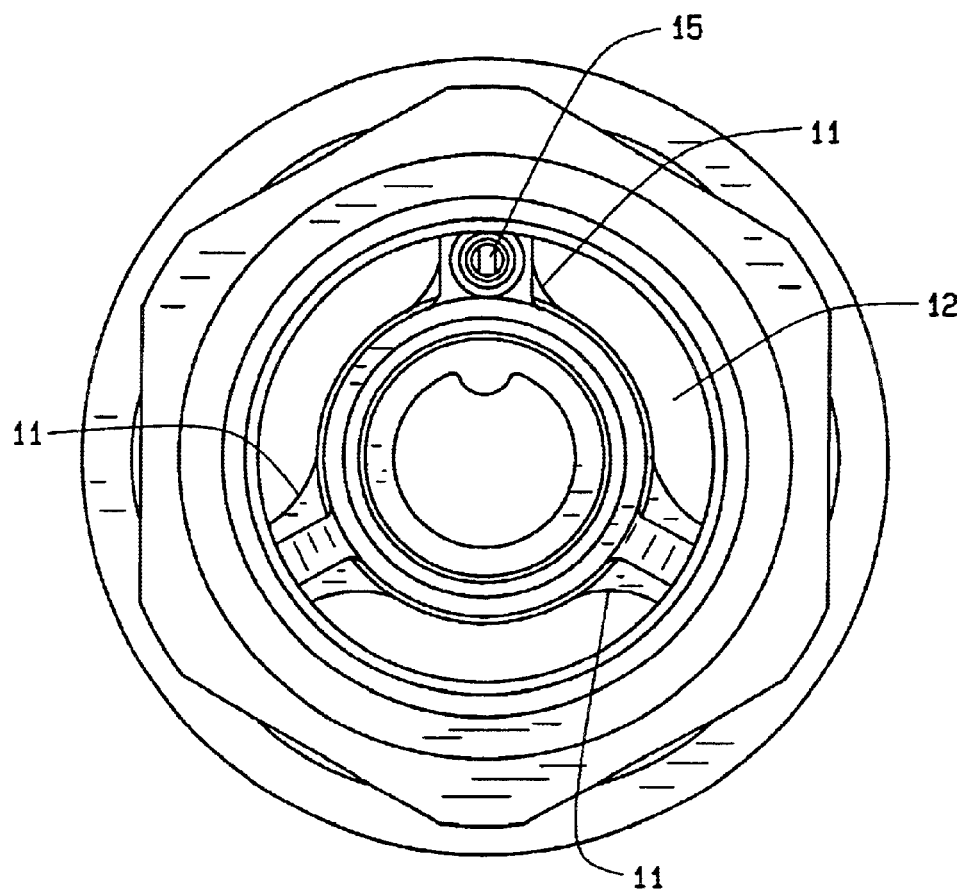
FIG. 4 is a front view of the connection part provided within the back end of the nozzle handle, generally observed from the left end when viewing FIGS. 1 and 2.

As can be seen internally of the nozzle hose connection, and referring also to FIG. 2, therein is disclosed that part of the connector 1 which is contained within the nozzle, as can be noted at 5. That particular component includes a cylindrical portion 6 having an integral flange 7 that extends radially, and which is inserted within the nozzle handle 2 to the extent where it abuts against a shoulder 3a around the inner perimeter of the opening 8 contained internally of the nozzle handle. This part of the connector is held in position by means of the clamp, or retaining ring 9, which when clamped into position, inserts within the internal groove 10 provided within the handle, and snuggly retains the part 5 in place. This part is further held in position by means of a spider 11, which has openings 12 provided around its perimeter, and which allows for passage of the vapors there through, on the return from the automobile, nozzle, and back to the dispenser, and hence to the underground storage tank, during collection. Only part of the spider can be seen in FIG. 2. See FIG. 4.

Provided internally of the cylindrical member 6, of the connecter part 5, is an opening 13, and it is through this opening that the gasoline or fuels flow, during filling of the automobile tank, through its dispensing through the nozzle, as well known in the art, and as previously explained herein.

As can be noted, there are a variety of ring seals or O rings, or gaskets, 14, which are designed for sealing with the hose connector part, as will be subsequently explained.

Provided through one leg of the spider 11 is a barbed tube connection 15, and it is through this connection that the slurpie tube mounts, and then extends forwardly within the nozzle to the vicinity of the venturi, in order to provide for the attraction of any accumulated fuels, at the bottom of the vapor section of the hose, as previously explained. This tube connection 15 communicates with a passage 16, through which the slurped fuel from the low point of the hose passes.

Figure 3:
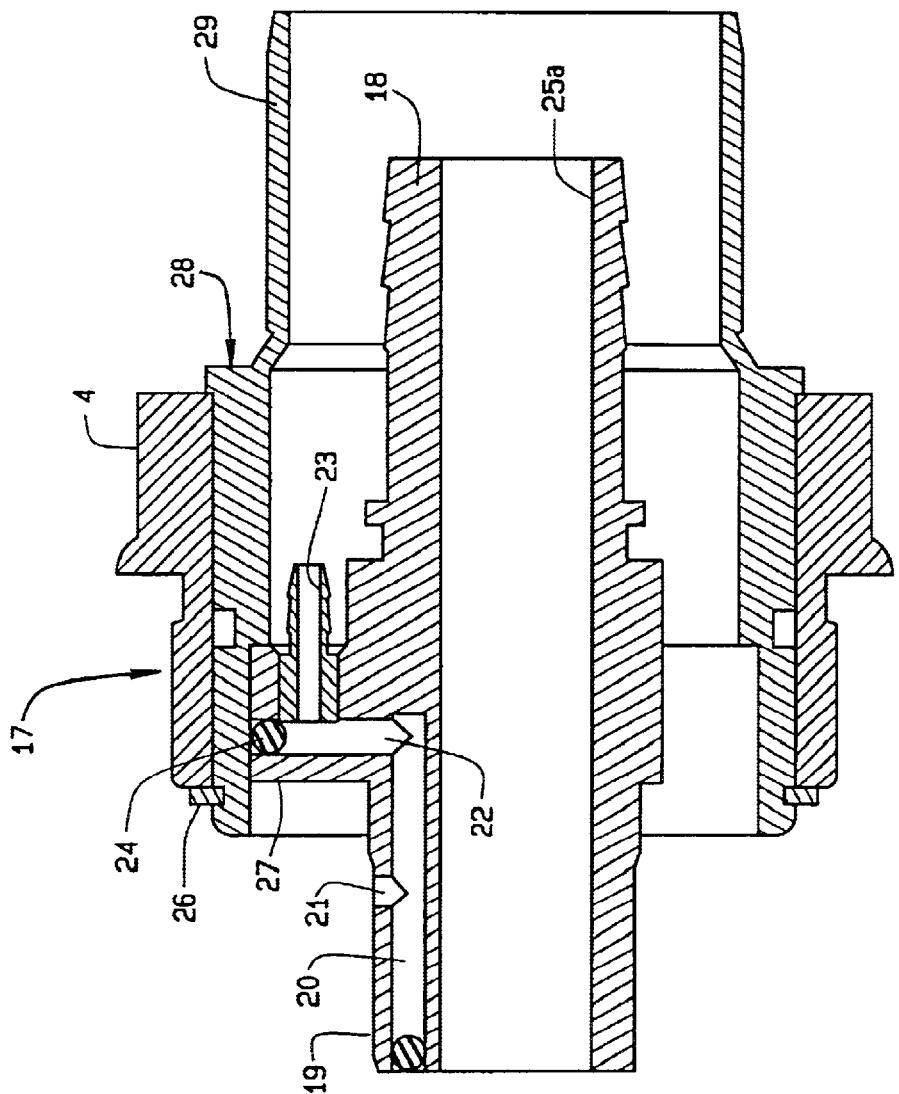
FIG. 3 shows the connection part that secures with the coaxial hose, before it is interconnected within the back end of the nozzle.

FIG. 3 discloses the part of the hose connection 17 that normally connects with the coaxial hose (not shown). This particular part includes a cylindrical portion 18, through which the fuel flows, and the frontal part of this portion slides snuggly within the cylindrical portion 6, as previously explained. The outer front surface of this component, as at 19, secures within the cylindrical portion 6, of the part 5, and is sealed into position by means of the various O rings 14. As can be noted, there is a passageway as at 20 provided through the cylindrical portion, and it opens, as at 21, to communicate with the passage 16, as previously reviewed. These two passages 16 and 21 align, when the part 17 is inserted within the component part 5.

A further passageway 22 is provided within the member, and communicates with another tube fitting 23, which connects with a flexible tube (not shown), that extends through the coaxial hose and to the bottom or low point of said hose where fuel is likely to condense and accumulate, in a manner as previously explained.

Connecting with the cylindrical portion 18, and integrally formed thereof is a second support 27, through which the further slurpie passageway 22 extends. Mounted onto the outer surface of the second support 27 is a sleeve 28. The sleeve 28 has a rearward extension 29 upon which the coaxial hose portion mounts, and is clamped into position, while its internal fuel dispensing hose mounts onto the barbed cylindrical portion 18, as can be noted, so that the fuel may flow through the channel 25a. In addition, the outer part of the coaxial hose concentric of the fuel dispensing hose forms the vapor part of the coaxial hose. The returning vapors pass through the various passages provided through the first and second support means, formed as spiders, to allow for return of vapors back to the dispenser, and to underground storage. Likewise, the slurpie tubes may connect onto the fittings 15 and 23, to allow extraction of the condensed fuel from the low point of the vapor part of the coaxial hose, and to be attracted back into the nozzle, by its venturi, said condensed fuels passing through the various passages 23, 22, 20, 16, and 15 through the vacuum attraction aspects of nozzle venturi.

It should be noted that both the passageways 22, and 16, are respectively closed by plugs 24 and 25, to close off the passageways, between the two tube fittings 15 and 23.

It can also be seen that the fastening nut 4, rotatably mounts onto the outer surface of the component 17, readily available for screwing into the nozzle 2, when securing the component 17 and 5 together. A retaining ring 26 holds the nut mounted for pivotal movement thereon. The nut firmly tightens these two components together, so the frontal portion 19 of the hose part will be snuggly and fluidically sealed within the nozzle part 5, to firmly hold them together, simply upon the insertion of one within the other, upon a tightening of the available nut 4.

As can be noted, internally of the cylindrical portion 18 is a channel 25a, and it is through this channel that the gasoline fuel is pumped through the nozzle, and into the vehicle tank. On the other hand, the vapors are allowed to return to the underground storage, by passing said vapors through the passages 12, formed of the spider 11, as previously reviewed. In addition, any accumulated or condensed fuel maintained at the low point of the coaxial hose, may be slurped by the proper placement of the tubing (not shown), that connects to the tube fittings 15 and 23, which attracts such fuel by way of the operations of the venturi of the nozzle, and reinserts such fuel back into the flow path, further down the nozzle, in the vicinity of its venturi and spout, for dispensing into the vehicle tank, during its filling.

The entire assembled slurpie hose connection, including both its nozzle part 5, and hose part 17, are shown assembled together, and fixed into position by means of the nut 4, within the back end of the nozzle, and connecting with the coaxial hose, as shown in FIG. 1. It is just as likely, though, that the coaxial hose may be of the inverted style, where perhaps vapors are returned through the center of the connection, or the inner concentric hose of the coaxial hose, and the fuel may flow peripherally thereof, through the outer part of the coaxial hose, as also known in the art.

Variations or modifications to the subject matter of this invention may occur to those skilled in the art upon review of the invention as described herein. Such further developments, or variations, if within the spirit of this development, are intended to be encompassed within the scope of the invention as described herein. The description of the preferred embodiment, and their disclosure in the drawings, are set forth for illustrative purposes only.

What is claimed is:

1. A slurpie hose connection for use with a fuel dispensing nozzle and fuel dispensing hose, said connection comprising two parts, said parts comprising a nozzle segment and a hose connecting segment, said nozzle segment comprising a first cylindrical portion, said first cylindrical portion having an opening extending therethrough, a first support provided upon the first cylindrical portion for use for supporting said portion within the nozzle handle, a retainer fastening said first support within a nozzle handle, said first support having a vapor passage provided therethrough;

said hose connecting segment having a second cylindrical portion, said second cylindrical portion having an opening provided therethrough and through which the fuel flows to the nozzle, a second support holding the second cylindrical portion within the hose connecting segment, said second support and said second cylindrical portion having a full slurpie passage provided therethrough, such that when the nozzle segment and the hose connecting segment are connected, the slurpie passage functions to provide for removal of residue fuel from a low point of the vapor passage of the fuel dispensing hose, a part of said second cylindrical portion disposed for fluidic sealing within a part of the first cylindrical portion, to allow for passage of the fuel therethrough and through the nozzle, and said first and second supports having openings therethrough to allow for return of the vapors therethrough for passage to storage.

2. The slurpie hose connection of claim 1 wherein the part of the second cylindrical portion inserts within the part of the first cylindrical portion, and a series of fluidic seals provided for sealing said portions together.

3. The slurpie hose connection of claim 2 wherein said seals comprise at least one O ring.

4. The slurpie hose connection of claim 2 wherein the slurpie passage within the second cylindrical portion opens at an end, and a seal is provided therein a slurpie passage provided within the second support having an opening upon an outer edge, and a seal provided therein, and a slurpie passage provided within the first cylindrical portion has an opening at one end, with a seal provided therein.

5. The slurpie hose connection of claim 2, and further including a sleeve mounting upon the second support, said sleeve at its back end having an extension thereat, a coaxial hose for securement thereon, a nozzle nut rotatably mounted onto the surface of said sleeve, whereby upon insertion of the hose connecting segment within the nozzle segment of the slurpie hose connection, the nozzle nut may be rotated within the end of the fuel dispensing nozzle and threadedly engage therein.

6. The slurpie hose connection of claim 5 wherein the second cylindrical portion at its back end has a fitting provided thereon and onto which the fuel dispensing hose of the coaxial hose secures thereon.

7. The slurpie hose connection of claim 1 wherein a first tube fitting connects with the first support, said first tube fitting having a passage therethrough, said first support having a slurpie passage provided therethrough, and said passage of the first tube fitting provided for communicating with the slurpie passage provided within said first support.

8. The slurpie hose connection of claim 7 wherein a second tube fitting connects with the second support, said second tube fitting having a passage provided therethrough and communicating with the second slurpie passage provided within said second support.

9. The slurpie hose fitting of claim 8 wherein slurpie tubes connect onto said first and second tube fittings, to provide for removal of condensed fuel from a low point of a vapor return portion of the fuel dispensing hose.

10. The slurpie hose connection of claim 1 wherein said first and second supports comprise spider supports.

* * * * *